(12) United States Patent
Levrai et al.

(10) Patent No.: US 7,077,051 B1
(45) Date of Patent: Jul. 18, 2006

(54) SELF-BOOSTING PNEUMATIC BOOSTER USING A PIVOTING KEY

(75) Inventors: Roland Levrai, Stains (FR); Olivier Castello, Bondy (FR); Philippe Richard, Chelles (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,383

(22) PCT Filed: Oct. 26, 1999

(86) PCT No.: PCT/FR99/02591

§ 371 (c)(1),
(2), (4) Date: Dec. 6, 1999

(87) PCT Pub. No.: WO00/24623

PCT Pub. Date: May 4, 2000

(30) Foreign Application Priority Data

Oct. 26, 1998 (FR) .................................. 98 13407

(51) Int. Cl.
*F15B 9/10* (2006.01)
(52) U.S. Cl. .................................. 91/376 R; 91/369.4
(58) Field of Classification Search ............... 91/369.3, 91/369.4, 376 R
See application file for complete search history.

(56) References Cited

U.S. PATENT DOCUMENTS

| | | | | | |
|---|---|---|---|---|---|
| 4,366,744 | A | * | 1/1983 | Katagiri et al. | ............ 91/369.3 |
| 4,934,249 | A | * | 6/1990 | Gautier et al. | ............ 91/376 R |
| 5,176,063 | A | * | 1/1993 | Levrai et al. | ............ 91/376 R |
| 5,483,866 | A | * | 1/1996 | Schluter | ................... 91/376 R |
| 5,857,399 | A | * | 1/1999 | Tsubouchi et al. | ........ 91/376 R |
| 5,873,247 | A | * | 2/1999 | Schluter et al. | ............ 91/369.4 |
| 6,138,548 | A | * | 10/2000 | Gautier et al. | ............ 91/376 R |

* cited by examiner

*Primary Examiner*—Edward K. Look
*Assistant Examiner*—Michael Leslie
(74) *Attorney, Agent, or Firm*—Leo H McCormick, Jr.; Sarah Taylor (57) ABSTRACT

A pneumatic booster operated by a plunger (9) housed in a bore (61) and bearing on a moving seat (102) which co-operates selectively with a shut-off member (111). The shut-off member (111) is capable of selective co-operating with a stationary seat (101). The plunger (9) being characterized by a cylindrical body (91) and a ring (92). The ring (92) sliding between a front stop (911) and a rear stop (912) on the cylindrical body (91). A front section of the ring (92) being located between the cylindrical body (91) and the bore (61) while a rear section (922) is designed to bear against the moving seat (102). The ring (92) being temporarily retained in a stationary position in the bore (61) independent of any movement of the cylindrical body (91) through the action of a pivoting key (13) and an elastic snap ring (141) to allow permit and extended actuation of the booster after a sharp braking action has occurred.

9 Claims, 6 Drawing Sheets

SELF-BOOSTING PNEUMATIC BOOSTER USING A PIVOTING KEY

The present invention relates to a pneumatic brake-booster.

More specifically, the invention relates to a brake-booster comprising: a rigid casing; a moving partition delimiting, in a sealed way, a front chamber and a rear chamber inside the casing, the front chamber in operation being permanently connected to a first source of pressure delivering a first pressure; a pneumatic piston moving with the moving partition and having a hub mounted to slide in an opening of the casing; an operating rod that can move in the hub between a position of rest and an extreme actuating position as a function of a resultant of forces which acts on it and which comprises an input force exerted in an axial actuating direction directed towards the front chamber, and a main return force exerted by a main spring in an axial return direction that is the opposite of the axial actuating direction; a plunger housed in a bore of the hub and carried along by the operating rod; and a three-way valve itself comprising a stationary annular seat formed at an internal periphery of the hub, a moving annular seat, concentric with the stationary seat and borne by the plunger and a tubular shutter concentric with the plunger and with the hub and having an annular front shut-off face, this front face co-operating selectively with the moving seat so as to isolate the rear chamber from a second source of pressure delivering a second pressure higher than the first, and this front face co-operating selectively with the stationary seat so as to allow the rear chamber to be connected to the second source of pressure.

BACKGROUND OF THE INVENTION

Devices of this type are well known in the prior art, as illustrated, for example, by patent documents U.S. Pat. No. 3,470,697, FR-2,532,084 and FR-2,658,466.

Recent research has shown that a good many drivers when confronted with an emergency-braking situation, underestimate the actual risks involved and, having braked suddenly, release their braking effort under circumstances where, on the contrary, maintaining a high effort is absolutely essential to avoid the accident.

This observation has led to the development of various solutions in an attempt to remedy the possibly defective behaviour of an inexperienced or panic-stricken driver.

The invention falls within this context and its object is to provide a simple solution to the problem of maintaining a high braking force following a sharp braking action.

SUMMARY OF THE INVENTION

To this end, the booster of the invention, which in other respects is in accordance with the definition given in the above preamble, is essentially characterized in that the plunger comprises a cylindrical body secured to the operating rod and a ring mounted to slide axially with respect to the cylindrical body between front and rear stops of the body, a front section of the ring being engaged between the cylindrical body and the bore of the hub, a rear section of the ring forming a collar on which the moving seat is defined, and the front and rear stops being separated from one another by a distance that allows the ring an axial excursion, in that a secondary spring exerts on the collar a secondary return force directed in the axial return direction and urging the collar towards the rear stop, and in that the ring and the hub comprise respective first and second reversible retaining means capable of keeping the ring stationary with respect to the hub in spite of the secondary return force exerted on the ring and correspondingly of allowing the rear chamber to be connected to the second source of pressure, these retaining means being activated by the ring being driven into the bore over a travel that is at least equal to a determined minimum travel, and being deactivated at least on the condition that the ring is driven along by the front stop when this front stop moves in the axial return direction under the effect of the main return force.

In a preferred embodiment of the invention, the retaining means comprise a pivoting key straddling the ring and an elastically retractable stop member connected to the hub, this stop member intercepting the key and applying a determined retaining force to it when these retaining means are activated.

This elastically retractable stop member may, for example, consist of a flexible strand of an elastic snap ring secured to the hub.

Apart from the pivoting key, the retaining means may also comprise an electromagnet secured to the hub and selectively operated in such a way as to retain this pivoting key once the ring has been driven into the bore over a travel at least equal to the determined minimum travel.

To further reduce the intensity of the residual input force that the driver has to apply in order to keep the booster of the invention in its actuating state after a sharp braking action, it may also be advantageous to envisage for the plunger to comprise a push-rod selectively given a sliding movement with respect to the cylindrical body, arranged in front of the cylindrical body in the actuating direction, and having a shoulder co-operating with the hub to limit the movement of this push-rod with respect to the hub in the axial return direction, to envisage for the cylindrical body to keep the push-rod in a forwards position, in the actuating direction, when the operating rod is in its extreme actuating position, the cylindrical body and the push-rod then being in axial contact one against the other, and to envisage for the shoulder of the push-rod to co-operate with the hub to cause the axial contact between the cylindrical body and the push-rod to cease when the operating rod returns to its position of rest.

Other features and advantages of the invention will emerge clearly from the description thereof given hereafter by way of non-limiting indication, with reference to the appended drawings.

DESCRIPTION OF THE INVENTION

The pneumatic booster of the invention comprises, as is known per se, a front shell 1a and a rear shell 1b which together form a rigid casing 1.

A moving partition 2 divides the inside of this rigid casing 1 in a sealed way and therein delimits a front chamber 3 and a rear chamber 4, the front chamber 3 in operation being connected to a first source of pressure D which delivers a first, relatively low, pressure Pd.

A pneumatic piston 5 moves with the moving partition 2 and has a hub 6 mounted to slide in an opening 19 of the casing 1.

Figure 1:
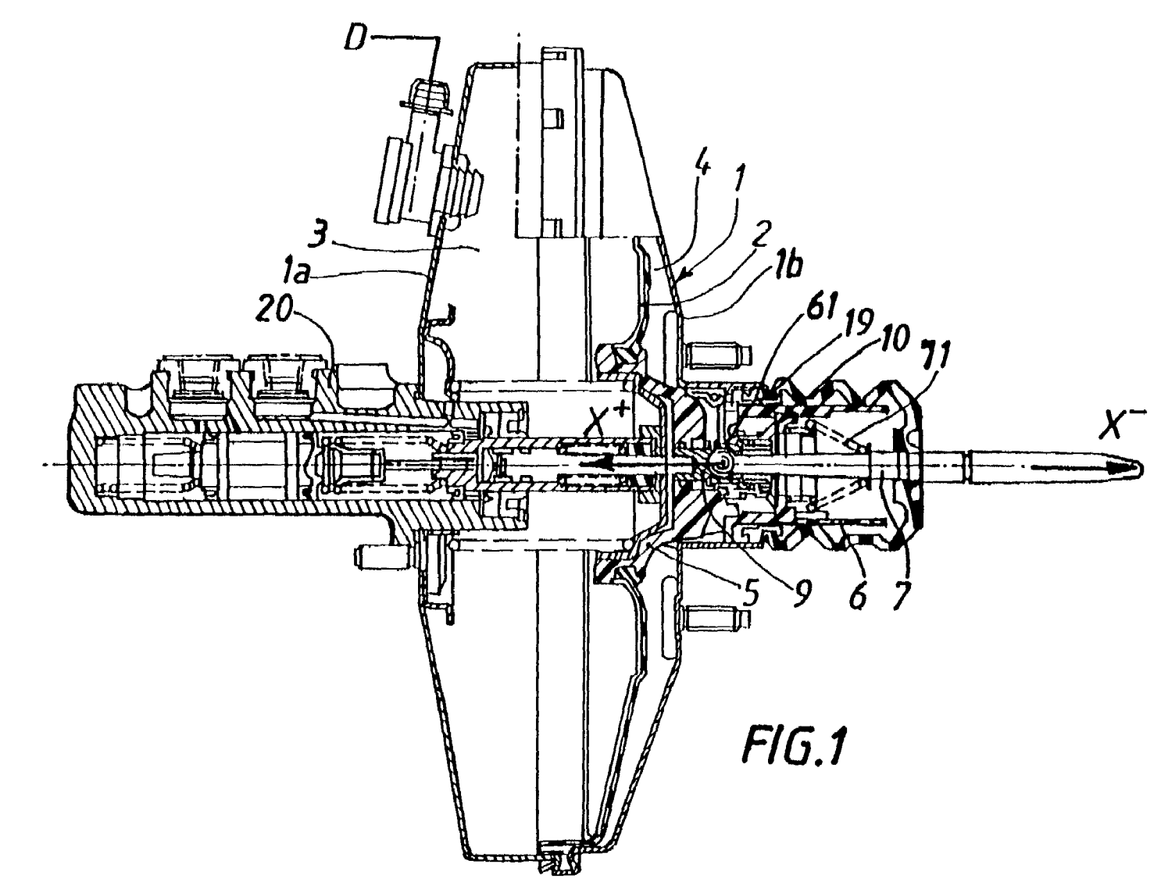
FIG. 1 is a view in section of a booster according to the invention.

The booster is operated by an operating rod 7 that can move in the hub 6 between a position of rest (FIGS. 1 and 2) and an extreme actuating position (FIG. 8), the position of this rod depending both on an input force Fe which is applied to this rod in an axial actuating direction X+ by the brake pedal (not depicted) and on a return force Frp exerted in the opposite direction X− by a main return spring 71.

A plunger 9, driven along by the operating rod 7, is mounted to slide in a bore 61 of the hub 6 to control the state of a three-way valve 10.

This valve 10 consists essentially (FIG. 2 et seq) of a stationary annular seat 101 formed at the internal periphery of the hub 6, a moving annular seat 102 which is concentric with the stationary seat 101 and borne by the plunger 9, and a tubular shutter 11 which is itself concentric both with the plunger and with the hub.

The tubular shutter 11 has an annular front shut-off face 111 intended to co-operate, depending on the position of the plunger 9, either with the moving seat 102, or with the stationary seat 101.

When the booster is at rest (FIGS. 1 and 2), the front face 111 of the shutter 11 presses against the moving seat 102 and isolates the rear chamber 4 from a second source of pressure A, generally consisting of the atmosphere, and which delivers a pressure Pa higher than the pressure Pd of the first source D.

By contrast, when an input force Fe appreciably higher than the return force Frp of the spring 71 is exerted on the rod 7, this force Fe causes the plunger 9 to move in the actuating direction X+ so that the front face 111 of the shutter 11 becomes detached from the moving seat 102, pressing against the stationary seat 101 (FIG. 3), the rear chamber 4 then finding itself connected to the source of pressure A.

The admission of air into the rear chamber pushes the moving partition 2 back in the actuating direction X+ and generates a boost force used to actuate the master cylinder 20.

Figure 2:
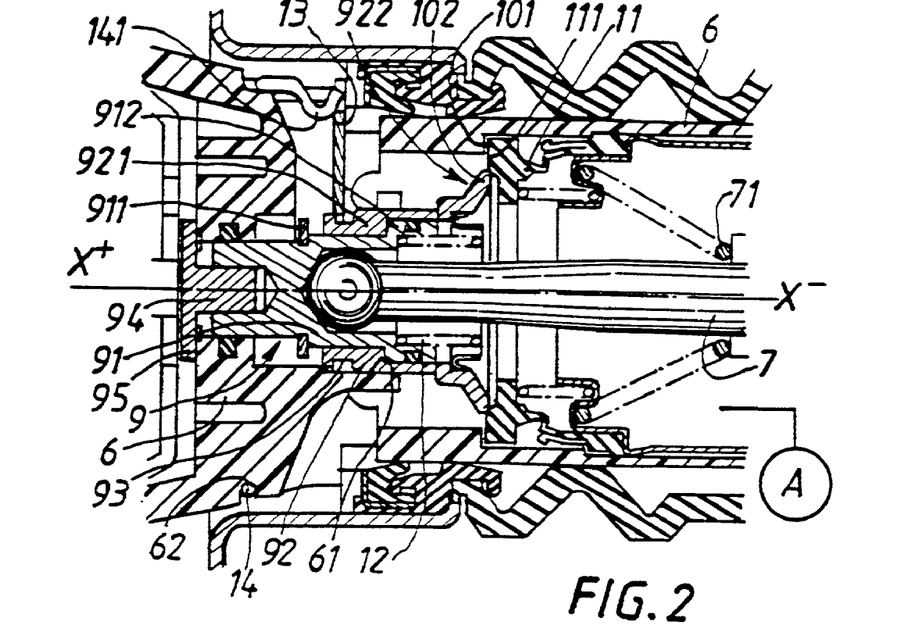
FIG. 2 is a view in section of the plunger of a booster according to the invention, seen at rest.

According to the invention, as shown best by FIG. 2 et seq, the plunger 9 comprises a cylindrical body 91 secured to the operating rod 7, and a ring 92.

The ring 92 is mounted to slide axially in a sealed way over the outside of the cylindrical body 91 between a front stop 911 and a rear stop 912, both borne by the body 91, the front 911 and rear 912 stops being separated from one another by a distance that allows the ring 92 an axial excursion over the body 91.

A front section 921 of the ring 92 is engaged in the annular space which separates the cylindrical body 91 from the bore 61 of the hub, and completely fills this space in a radial direction.

A rear section 922 of the ring 92 is shaped as a collar and bears the moving seat 102.

A secondary return spring 12 exerts on the collar 922 a secondary return force Frs directed in the axial return direction X− and urging the collar 922 towards the rear stop 912.

Figure 7:
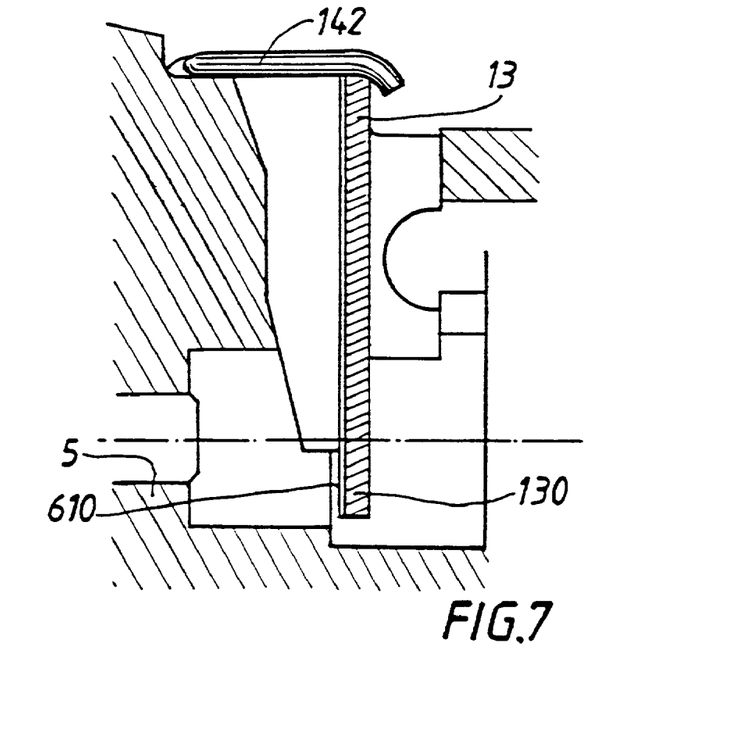
FIG. 7 is a view in section of the pneumatic piston seen in the direction marked by the arrows 7—7 of FIG. 6.
Figure 8:
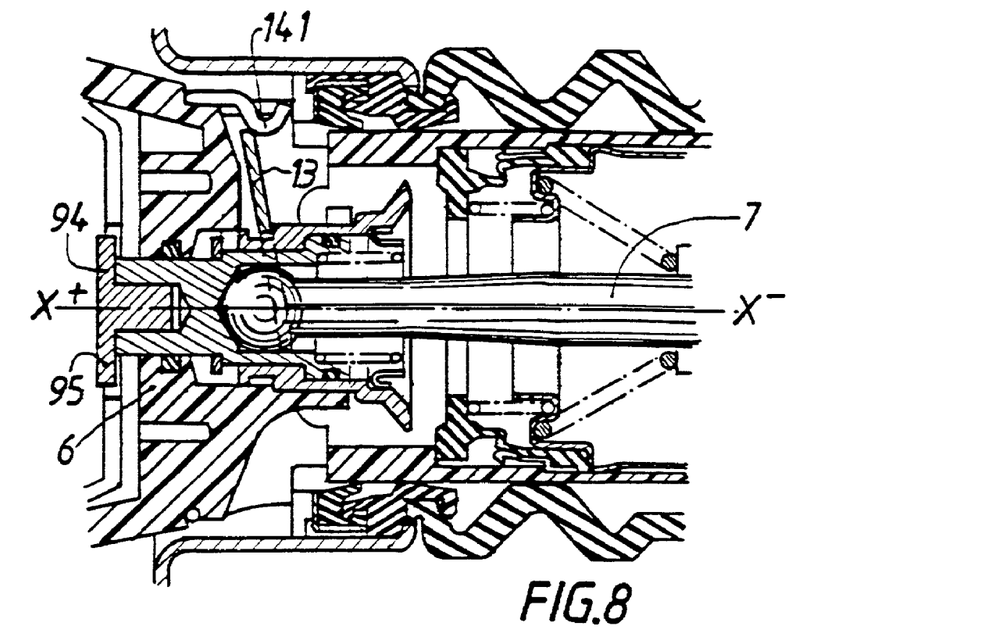
FIG. 8 is a view in section of the plunger of a booster in accordance with the invention, seen in its specific operating mode, this view depicting the retaining means in their activated state.

A pivoting key 13 is engaged in a transverse peripheral groove 93 of the ring 92 so as to straddle this ring 92, to move with it along the axis of the directions X− and X+, and be able to incline with respect to the plane formed by the groove 93, as shown by a comparison between FIGS. 2 and 8, when its base 130 encounters a stop 610 formed in a cutout in the hub 6 (see FIG. 7).

Figure 3:
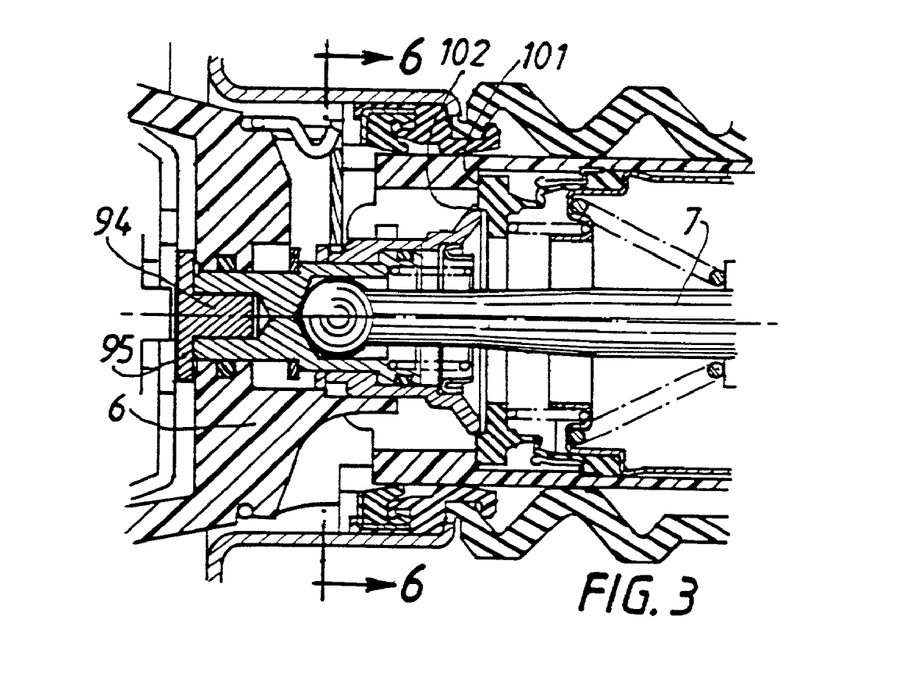
FIG. 3 is a view in section of the plunger of a booster according to the invention, seen in its standard operating mode.
Figure 4:
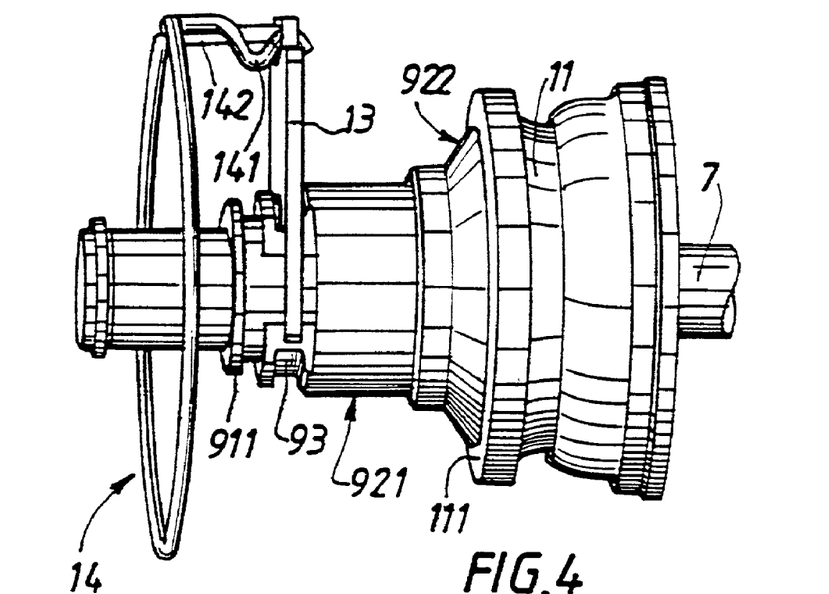
FIG. 4 is a view in perspective of the plunger and of the associated members of a booster in accordance with the invention, illustrating the pivoting key and the elastic snap ring.

An elastically retractable stop member 141 is also connected to the hub 6 so as to intercept the key 13 when the ring 92 is driven into the bore 61 over a travel that exceeds the travel through which this ring moves in the case of normal actuation of the booster, illustrated in FIG. 3.

Figure 5:
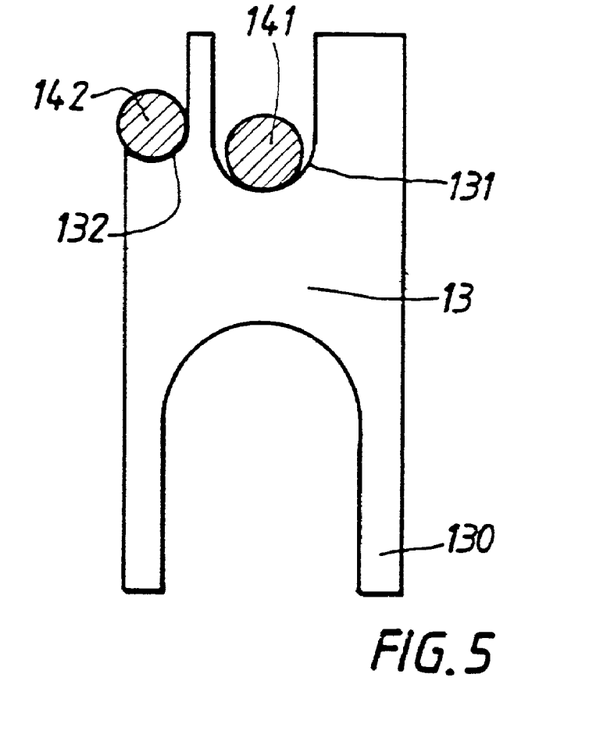
FIG. 5 is a front-on view of the pivoting key associated with a view in section of the elastic snap ring.
Figure 6:
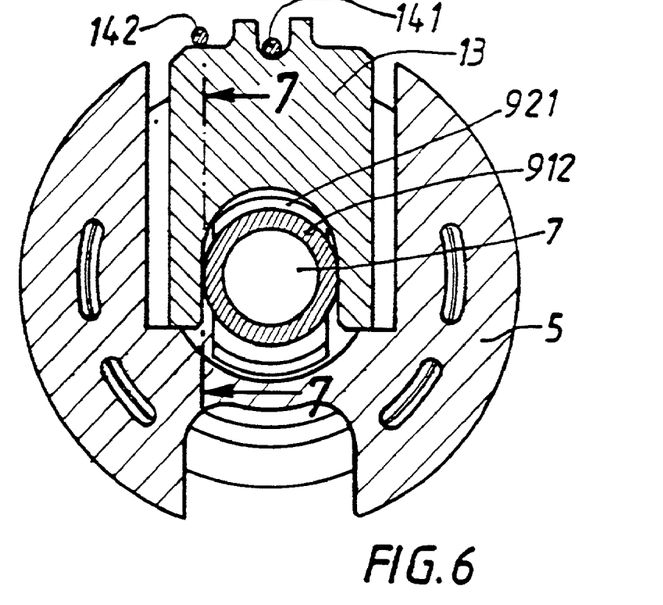
FIG. 6 is a view in section of the pneumatic piston seen in the direction marked by the arrows 6—6 of FIG. 3.

The elastically retractable stop member 141 consists, for example, of a flexible strand forming a bent-over end of an elastic snap ring 14 which, incidentally, is of essentially circular shape, engaged in a groove 62 of the hub 6. Each of the ends 141, 142 of the snap ring 14 is preferably engaged in a corresponding cut 131, 132 of the key 13 so as to achieve optimum guidance of these ends (see FIG. 5).

Thus, in the case illustrated in FIG. 8 in which the booster is actuated sharply enough for the ring 92 to be driven into the bore 61 over a travel that exceeds a determined minimum travel C, the key 13 engages in the stop member 141, which then applies to the key 13, and therefore to the ring 92, a determined retaining force capable of keeping the ring 92 stationary with respect to the hub 6 in spite of the secondary return force Frs exerted by the spring 12, and correspondingly of allowing the rear chamber 4 to be connected to the second source of pressure A.

Figure 9:
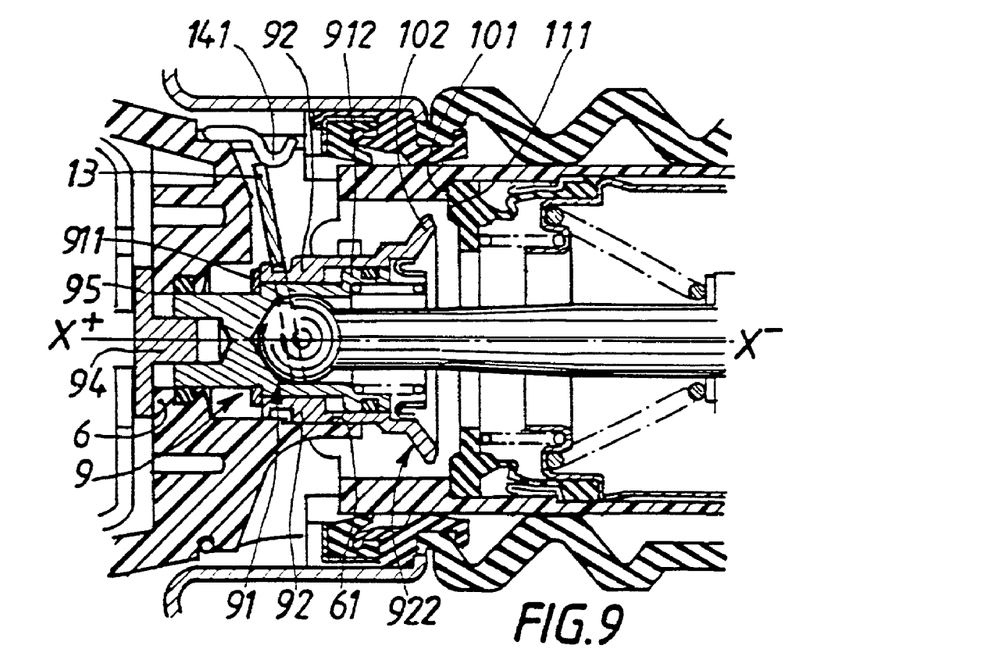
FIG. 9 is a view in section of the plunger of a booster in accordance with the invention, seen in its specific operating mode, this view depicting the retaining means in their activated state and during co-operation.

Under these conditions, the valve 10 remains open, even when the driver partially releases his braking effort, as shown in FIG. 9.

Figure 10:
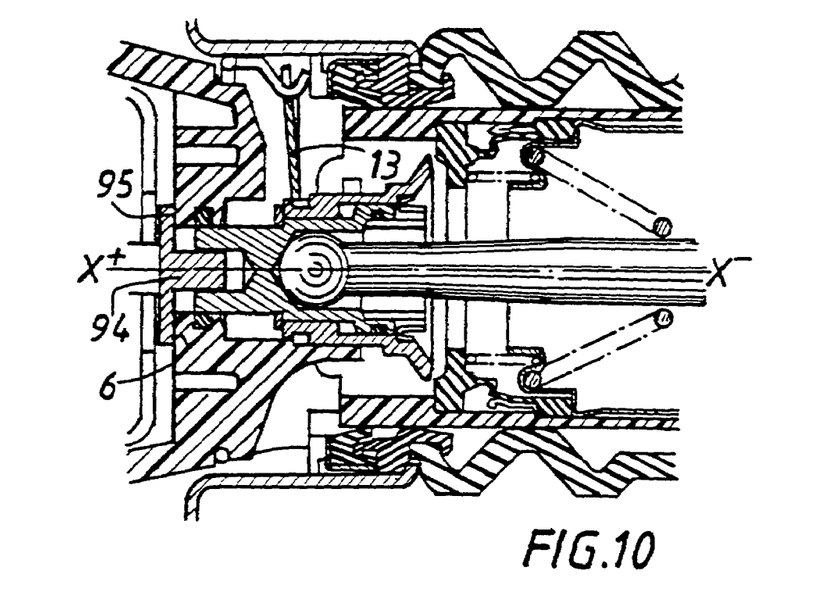
FIG. 10 is a view in section of the plunger of a booster in accordance with the invention, seen in its specific operating mode, this view depicting the retaining means during deactivation.

To allow the booster to return to its state of rest, the front stop 911 has to move, under the effect of the main return force Frp exerted by the spring 71, and drive the ring 92 along in the axial return direction X−, which assumes that the driver reduces his braking effort to the point where the main return force Frp and the secondary return force Frs can together manage to overcome the input force Fe and the retaining force exerted by the stop member 141 on the key 13, the latter then disengaging from the stop member as shown by FIG. 10.

Figure 11:
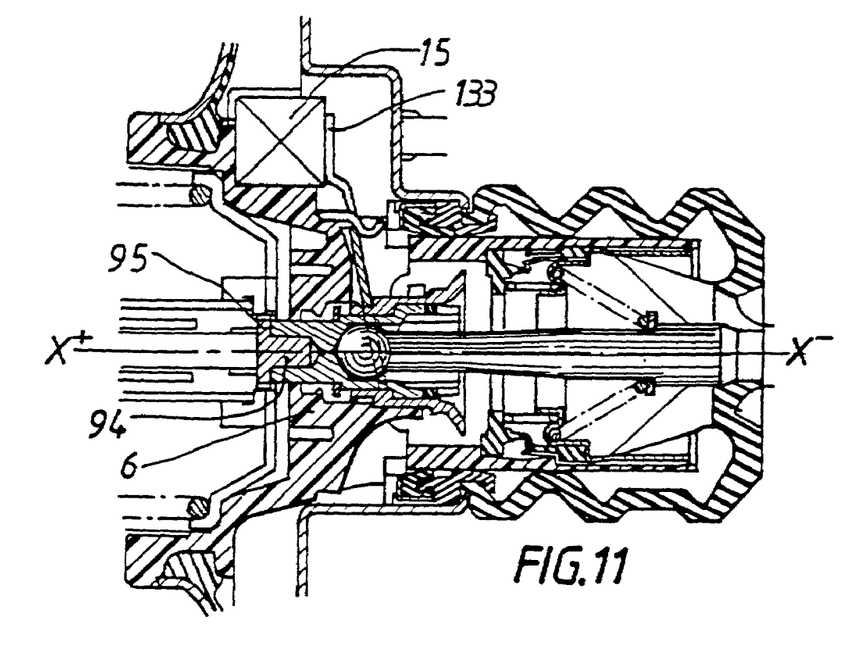
FIG. 11 is a view in section of the plunger of a booster in accordance with a second embodiment of the invention, this view depicting the retaining means in their activated state and during co-operation.

FIG. 11 illustrates one embodiment of the invention, by virtue of which it is possible, after the booster has been actuated sharply, to keep the valve 10 open even if the driver completely releases his braking effort.

To this end, the booster in accordance with this embodiment comprises, in addition to the pivoting key 13 and possibly the stop member 141, an electromagnet 15 which is secured to the hub 6 and which is operated selectively to apply to the pivoting key a retaining force that is capable, either by itself or assisted by the retaining force exerted by the stop member 141, of keeping the ring 92 in an actuating position as illustrated in FIG. 11.

As this figure also shows, the key 13 is then preferably equipped with an extension 133 via which it can be attracted by the electromagnet 15.

FIGS. 2, 3 and 8 to 11 also illustrate additional features which make it possible to reduce still further the value of the residual input force that the driver needs to apply in order to keep the booster of the invention in its actuating state after intense braking.

To this end, the plunger 9 comprises a push-rod 94 which is mounted to slide with respect to the cylindrical body 91 and which is arranged in front of the latter in the actuating direction X+.

When the operating rod 7 is in its position of rest (FIG. 2), the cylindrical body 91 and the push-rod 94 are not axially in contact one against the other, in other words, they are axially distant from one another.

The push-rod 94 has a shoulder 95 capable of coming into rear abutment against the hub 6 in order to limit the movement of this push-rod 94 with respect to the hub 6 in the axial return direction X−.

When the operating rod 7 is in its extreme actuating position (FIG. 8), the cylindrical body 91 keeps the push-rod 94 in an advanced position, in the actuating direction X+, the cylindrical body 91 and the push-rod 94 then being in axial contact one against the other, and the shoulder 95 of the push-rod being detached from the hub 6.

By contrast, when the operating rod 7 returns to its position of rest after a sharp braking action (FIG. 9), the shoulder 95 of the push-rod 94 co-operates again with the hub 6 to make the axial contact between the cylindrical body 91 and the push-rod 94 cease.

In this way, the reaction forces which are applied to the push-rod 94 in the return direction X− are not transmitted to the operating rod 7, which means that keeping this rod in the position as illustrated in FIG. 9 for which the booster remains actuated requires only a very small effort on the part of the driver.

We claim:

1. A pneumatic brake booster comprising:
   a rigid casing;
   a moving partition for delimiting in a sealed way a front chamber and a rear chamber inside of said casing, said front chamber in operation being permanently connected to a first source of pressure having a first pressure;
   a pneumatic piston moving said moving partition and having hub mounted to slide in an opening in said casing;
   an operating rod that moves in said hub between a position of rest and an extreme actuating position as a function of a resultant of forces, said resultant of forces comprising an input force exerted in an axial actuating direction directed toward said front chamber and a main return force exerted by a main spring in an axial direction toward said rear chamber;
   a plunger located in a bore of said hub and carried along by said operating rod; and
   a three-way valve having a stationary annular valve seat formed on an internal periphery of said hub, a moving annular seat which is concentric to said stationary seat and borne by said plunger, and a tubular shutter concentric with said plunger and with said hub, said tubular shutter having an annular front shut-off face which co-operates selectively with said moving seat to isolate said rear chamber from a second source of pressure, said second source of pressure having a second pressure higher than said first pressure, said front shut-off face co-operating selectively with said stationary seat to allow said rear chamber to be connected to said second source of pressure, said plunger being characterised by a cylindrical body secured to said operating rod and a ring mounted to slide axially on said cylindrical body between a front stop and a rear stop, said ring having a front section located between said cylindrical body and said bore of said hub, said ring having a rear section which forms a collar on which said moving seat is defined, said front stop being separated from said rear stop by a distance which provides an axial excursion for said ring, and in that a secondary spring which exerts a secondary return force on said collar in said axial return direction to urge said collar toward said rear stop, and in that said ring and hub comprise first and second reversible retaining means for keeping said ring stationary with respect to said hub in opposition to said secondary return force acting on said ring to allow said rear chamber to be connected to said second source of pressure, said first and second retaining means being activated by said ring being moved into said bore over a travel distance which is equal to a minimum travel distance and being deactivated when said ring engages and moves said front stop in said axial return direction under the effect of said main return force.

2. The booster according to claim 1 wherein said retaining means is characterised by a pivoting key which straddles said ring and an elastically retractable stop member connected to said hub, said retractable stop member intercepting said key and applying a determined retaining force on said key on activating said retaining means.

3. The booster as recited in claim 2 wherein said elastically retractable stop member is characterised by a flexible strand of an elastic snap ring secure to said hub.

4. The booster as recited in claim 1 wherein said retaining means is characterised by a pivoting key which staddles said ring and an electromagnet secured to said hub, said electromagnet being selectively operated to retain said pivoting key when said ring is moved into said bore over said minimum travel.

5. The booster as recited in claim 1 wherein said plunger is characterised by a push-rod having a sliding movement with respect to said cylindrical body, said push-rod being located in front of said cylindrical body in said actuating and having a shoulder which co-operates with said hub to limit the movement of said push-rod with respect to said hub in said axial return direction, said cylindrical body retaining said push-rod in a forward position of said actuating direction, said cylindrical body and said push-rod being in axial contact against each other when said cylindrical body is in said extreme actuating position, and shoulder of said push-rod co-operating with said hub to cause said axial contact to cease when said operating rod returns to a position of rest.

6. The booster as recited in claim 2 wherein said retaining means is characterised by a pivoting key which staddles said ring and an electromagnet secured to said hub, said electromagnet being selectively operated to retain said pivoting key when said ring is moved into said bore over said minimum travel.

7. The booster as recited in claim 3 wherein said retaining means is characterized by a pivoting key which staddles said ring and an electromagnet secured to said hub, said electromagnet being selectively operated to retain said pivoting key when said ring is moved into said bore over said minimum travel.

8. The booster as recited in claim 2 wherein said plunger is characterised by a push-rod having a sliding movement with respect to said cylindrical body, said push-rod being located in front of said cylindrical body in said actuating and having a shoulder which co-operates with said hub to limit the movement of said push-rod with respect to said hub in said axial return direction, said cylindrical body retaining said push-rod in a forward position of said actuating direction, said cylindrical body and said push-rod being in axial contact against each other when said cylindrical body is in said extreme actuating position, and shoulder of said push-rod co-operating with said hub to cause said axial contact to cease when said operating rod returns to a position of rest.

9. The booster as recited in claim 3 wherein said plunger is characterised by a push-rod having a sliding movement with respect to said cylindrical body, said push-rod being located in front of said cylindrical body in said actuating and having a shoulder which co-operates with said hub to limit the movement of said push-rod with respect to said hub in said axial return direction, said cylindrical body retaining said push-rod in a forward position of said actuating direction, said cylindrical body and said push-rod being in axial contact against each other when said cylindrical body is in said extreme actuating position, and shoulder of said push-rod co-operating with said hub to cause said axial contact to cease when said operating rod returns to a position of rest.

* * * * *